Dec. 12, 1933.　　　　J. A. SILVER　　　　1,939,418
STILL AND PROCESS OF WATER DISTILLATION
Filed May 23, 1930
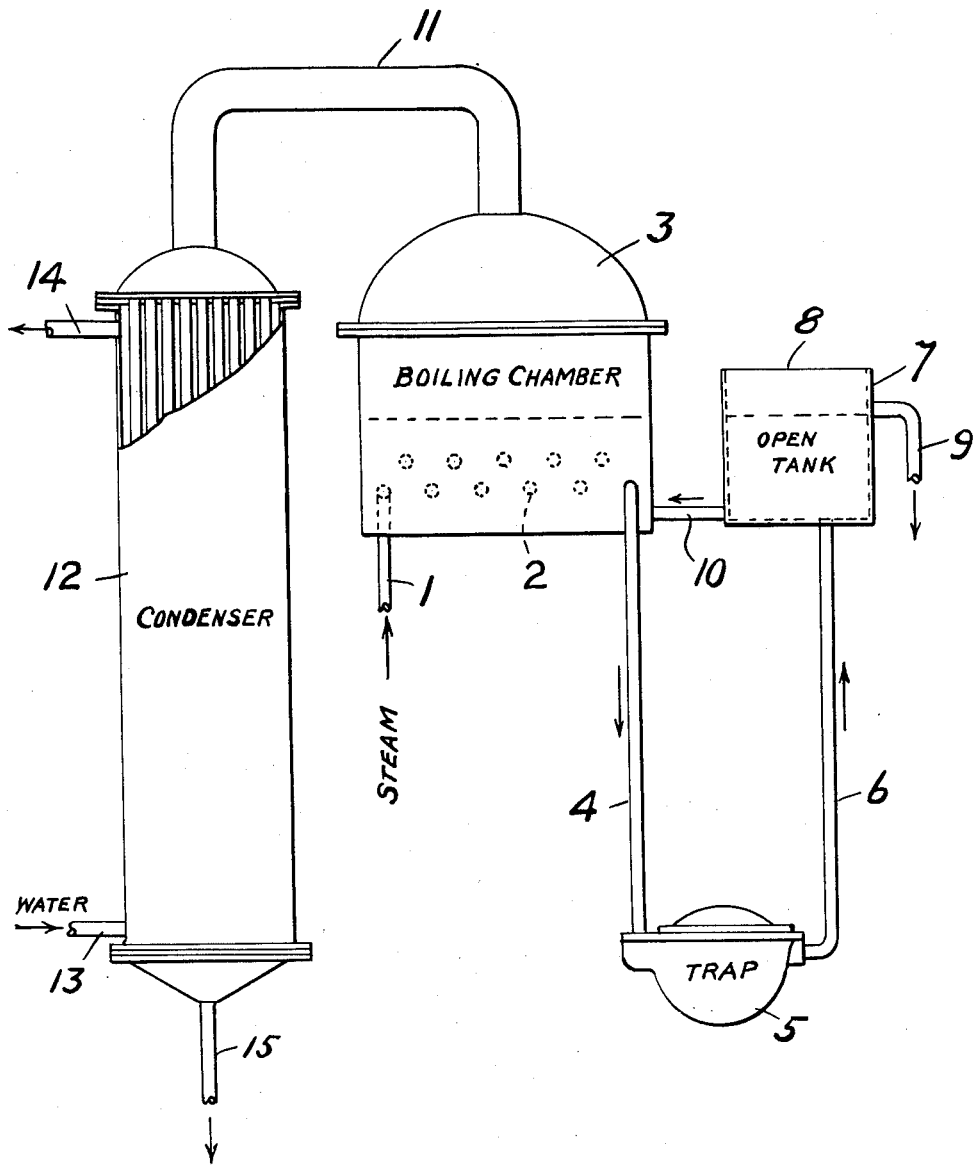
INVENTOR
John A. Silver
BY
Augustus B. Stoughton
ATTORNEY.
WITNESS:

Patented Dec. 12, 1933

1,939,418

UNITED STATES PATENT OFFICE 1,939,418

STILL AND PROCESS OF WATER DISTILLATION

John A. Silver, Philadelphia, Pa., assignor to F. J. Stokes Machine Co., Philadelphia, Pa., a corporation of Pennsylvania Application May 23, 1930. Serial No. 454,858

6 Claims. (Cl. 202—56)

My invention consists in improvements to steam heated water distilling apparatus whereby it is adapted for operation in hard water districts or where the water supply carries mud or organic impurities. This still also embodies an arrangement which eliminates dissolved gases, such as chlorine, ammonia and carbon dioxide from water before it is fed into the still.

This still may be of any design which comprises a boiling or distilling chamber with some form of heating element into which steam may be introduced for evaporating the water in the distilling chamber and a condenser.

Where water is distilled from hard water, the scale forming salt deposits on the heating element of the still, rapidly decreasing its efficiency, so that it soon becomes necessary to remove and clean the heating elements. This is a laborious and expensive operation.

The manner in which I accomplish these results is to feed to the still, water from which these impurities have been removed. To this end I discharge the trap water from the heating element in the still into a receptacle, which is opened to the air and from this receptacle into the boiling chamber of the still. As there will be always more trap water discharged than distilled water produced, there will be ample supply for the still. The trap water being condensed steam from any source is necessarily free from scale forming materials and mud.

The trap water, however, may contain ammonia, chlorine and carbon dioxide as free gas, and these gases escape into the air when they reach the open receptacles so do not enter the still.

The still, therefore, can operate continuously without becoming scaled or foul and will produce a distilled water of very superior purity.

For a further exposition of my invention, reference may be had to the annexed drawing and specification, at the end whereof my invention will be specifically pointed out and claimed.

In the drawing is a diagrammatic showing of my invention with parts broken away.

In the preferred embodiment of my invention, disclosed in the drawing, there is shown a steam inlet pipe 1 leading from any suitable source of steam supply. Connected to inlet pipe 1 is a steam coil 2 or any suitable heat supplying element housed in a shell which forms a boiling chamber 3. From the heating coil 2 pipe 4 leads off to trap 5 or any other suitable means for separating the condensate from the heating element from the exhaust steam. From trap 5 pipe 6 leads to the tank 7 which has an open top 8 where free gases, such as ammonia, chlorine and carbon dioxide may escape and an overflow pipe 9 for the surplus water.

From the bottom of tank 7 pipe 10 leads to boiling chamber 3 so that heating coil 2 is submerged in water. The heat of the steam in coil 2 is sufficient to boil the water in boiling chamber 3 so that the resultant steam passes off through pipe 11 to condenser 12. Condenser 12 may be a tubular or worm condenser, the tubes of which are surrounded by a water jacket having inlet and outlet pipes 13 and 14 for cooling water. Condenser 12 may be of any other type of condenser suitable. From the bottom of the condenser condensate is recovered from the outlet pipe 15.

From the foregoing it will be apparent that when this apparatus is used no scale can be deposited on the heating elements nor mud nor dirt, otherwise carried by the raw water, accumulate in the distilling chamber, and further that gases accompanying the trap water escape and do not enter the distilling chamber.

I do not intend to be limited in the practice of my invention save as the scope of the prior art and of the attached claims may require.

I claim:

1. A distilling apparatus including in combination a heat supplying element adapted to utilize as its heating medium a fluid in the gaseous or vapor phase and to condense said fluid by extracting heat therefrom, an open receptacle connected to said heat supplying element to receive said condensate from said heat supplying element and to expose said condensate to the atmosphere, a distilling chamber in heat exchange relation to said heat supplying element and connected to said receptacle to receive condensate from said receptacle and to distil to vapor said condensate by the heat from said heat supplying element, and a condenser connected to said distilling chamber to receive and condense vapors distilled from said distilling chamber.

2. A distilling apparatus according to claim 1 in which there is interposed in the connection between the heat supplying element and the receptacle, means for preventing the passage of said fluid in the gaseous or vapor phase and for permitting the passage of said fluid in the liquid or condensed phase to said receptacle.

3. A water distilling and purifying apparatus including a heat supplying element adapted to utilize steam as its heating medium and to condense steam by extracting heat from the steam, an open receptacle connected to said heat supplying element to receive condensed water from said heat supplying element and to expose said condensed water to the atmosphere to cause the escape of gas from the water, a distilling chamber in heat exchange relation to said heat supplying element and connected to said receptacle to receive exposed water from said receptacle and to distil said exposed water to vapor by heat from said heat supplying element, and a condenser connected to said distilling chamber to receive and condense vapor from said distilling chamber.

4. An apparatus according to claim 3 in which there is interposed in the connection between the heat supplying element and the receptacle, a trap which prevents the passage of steam and which permits the passage of condensed water from said heat supplying element to said receptacle.

5. A process of distilling and purifying water, which process comprises the following steps: boiling water by a suitable heating means to produce steam; extracting heat from said steam, which steam is at a temperature above the boiling point of water as said steam commences undergoing this step, by establishing a heat exchange relation between said steam and water condensate from steam which has previously undergone this step, the water condensate being at a temperature below the boiling point of water, whereby said steam or a portion of said steam is condensed to water condensate; exposing the said water condensate from the foregoing step to the atmosphere whereby gases are caused to escape from said water; establishing a heat exchange relation between the water condensate from the foregoing step and steam undergoing the second step above mentioned, whereby the heat extracted from the steam distils the said water condensate; and condensing the distillate of said last mentioned step of distillation and recovering the said condensed distillate as distilled and purified water.

6. A process according to claim 5, in which process there is interposed, after the second step of claim 5, a step of separating any steam remaining uncondensed after the second step of claim 5 from the water condensate formed by said step and preventing the said steam from contacting with the said water condensate undergoing the third step of claim 5.

JOHN A. SILVER.